United States Patent [19]
Hikmet

[11] Patent Number: 5,262,882
[45] Date of Patent: Nov. 16, 1993

[54] LIQUID CRYSTAL DEVICE ORIENTATION LAYER OF AN ORIENTED POLYMER NETWORK CONTAINING LIQUID CRYSTAL

[75] Inventor: Rifat A. M. Hikmet, Eindhoven, Netherlands

[73] Assignee: U.S. Philips Corporation, New York, N.Y.

[21] Appl. No.: 858,258

[22] Filed: Mar. 26, 1992

[30] Foreign Application Priority Data

Mar. 26, 1991 [EP] European Pat. Off. ........ 91200676.4

[51] Int. Cl.$^5$ ...................... G02F 1/1337; G02F 1/13
[52] U.S. Cl. ...................................... 359/75; 359/103; 359/51; 359/76
[58] Field of Search ........................ 359/75, 76, 77, 78, 359/51, 53

[56] References Cited

U.S. PATENT DOCUMENTS

| | | | |
|---|---|---|---|
| 4,840,680 | 6/1989 | Yamazaki | 359/75 |
| 4,842,375 | 6/1989 | Seeboth et al. | 359/75 |
| 4,892,392 | 1/1990 | Broes et al. | 359/76 |
| 4,983,479 | 1/1991 | Broes et al. | 430/20 |
| 5,067,797 | 11/1991 | Yokokura et al. | 359/75 X |
| 5,155,610 | 10/1992 | Hikmet et al. | 359/75 |
| 5,204,763 | 4/1993 | Hikmet | 359/51 |

FOREIGN PATENT DOCUMENTS 0501905 10/1991 European Pat. Off. .
1-94318 4/1989 Japan .

*Primary Examiner*—William L. Sikes
*Assistant Examiner*—Kenneth Parker
*Attorney, Agent, or Firm*—Norman N. Spain

[57] ABSTRACT

An orientation layer for a liquid crystal display device is formed from a mixture of at least one reactive liquid-crystal material and at least one non-reactive liquid-crystal material. The mixture is brought into contact with a surface of a mold having an orienting effect, as a result of which the molecules in the mixture are oriented. Subsequently, the reactive liquid-crystal material is made to cure, thereby forming an oriented polymer network in which the non-reactive liquid-crystal material is dispersed. The orientation layer thus manufactured is very suitable for use in an active display device. The liquid crystal device formed has a liquid crystal layer and orientation layers of an oriented polymer network in which liquid crystal material is dispersed.

4 Claims, 2 Drawing Sheets

8%

51%

25%

16%

LIQUID CRYSTAL DEVICE ORIENTATION LAYER OF AN ORIENTED POLYMER NETWORK CONTAINING LIQUID CRYSTAL

BACKGROUND OF THE INVENTION

The invention relates to a method of manufacturing a liquid crystal display device comprising an orientation layer, said orientation layer being formed in contact with the surface of a mold, which mold is subsequently removed.

The invention also relates to a liquid crystal display device comprising an orientation layer and switchable liquid-crystal material.

A liquid crystal display device comprises a cell with switchable liquid-crystal material between two flat substrates on which electric conductor tracks may be present which can be used to switch the liquid-crystal material between an "on" and an "off" state in accordance with a desired pattern. To this end, one or both substrates of a so-called active display device may additionally be provided with switching elements such as transistors. Orientation layers are frequently applied between a substrate having conductor tracks and the switchable liquid-crystal material to provide the molecules of the liquid-crystal material with a parallel (homogeneous), perpendicular (homeotropic) or oblique (tilted) preferred orientation. It is possible to provide an orientation layer on one or on both sides of the cell, i.e. on one or on both substrates. Polymer layers of, for example, polyethylene or polyimide are often used for this purpose, which layers are rubbed in one direction, for example, by means of a cloth. This has the disadvantage, however, that underlying electric elements such as wiring or transistors may be damaged, for example, mechanically or by a static charge. Another type of orientation layer consists of a layer of silicon oxide which is provided at an angle by vacuum evaporation, but such layers cannot readily be manufactured on a large scale.

An alternative orientation layer for a liquid crystal display device is described in an abstract relating to the published Japanese Patent Application JP 1-94318, in Patent Abstracts of Japan, Volume 13, Number 329 (P-904) on page 122 (1989). In said abstract the orientation layers are formed in contact with the surface of a mold which is subsequently removed. The surface of the mould contacting the orientation layers to be formed is provided with a saw-tooth structure which is transferred to the surface of the orientation layers. These orientation layers, which consist of polyimide, are rubbed in the desired directions after which the cell is filled with a ferroelectric liquid-crystal material and spacers in a manner which is known per se, and then sealed. A disadvantage of this known method resides in the necessity of using a mold having an accurately mechanically machined surface. This method can only be used to obtain an orientation having a small angle of inclination. Further, an unsmooth intermediate face in the display device is undesirable because of the effects it has on the optical properties.

OBJECTIVES AND SUMMARY OF THE INVENTION

It is an object of the invention to provide, inter alia, a simple method of manufacturing an orientation layer in a liquid crystal display device. The invention particularly aims at providing a method which can suitably be used for the manufacture of an active display device. It is an object of the invention to provide a liquid crystal display device comprising an orientation layer having a very effective orienting effect. The invention further aims at providing a display device having a flat and smooth orientation layer.

According to the invention these objects are achieved by a method as described in the opening paragraph, in which the surface of the mold contacting the orientation layer to be formed is flat and has an orienting effect, and in which the orientation layer is formed from a mixture of at least one reactive liquid-crystal material and at least one non-reactive liquid-crystal material, the reactive liquid-crystal material being cured in the oriented state.

In a preferred embodiment of the method according to the invention the surface of the mold having an orienting effect consists of a rubbed polymer layer. Polymer layers which are customarily used for this purpose, such as layers of polyethylene or polyimide, can suitably be used, which layers are rubbed in one direction, for example, with a non-fluff cotton cloth before they are used.

To fix the orientation of the molecules in the orientation layer in an effective and rapid manner it is advantageous, according to the invention, to cure the reactive liquid-crystal material by means of actinic radiation. Actinic radiation is to be understood to mean herein, for example, radiation with UV light, electrons, X-rays, gamma rays or high-energy particles. In the method according to the invention, the orientation layer is preferably cured by UV light in order to prevent the underlying electric elements from being damaged. When UV light is used, in general, a small quantity of a light-sensitive initiator will be added to the reactive material according to a method which is known per se.

In a very efficacious embodiment of the method according to the invention, the reactive liquid-crystal material is cured, thereby forming a polymer network in which the non-reactive liquid-crystal material is dispersed. A network can be manufactured by applying a monomer reactive material having at least two reactive groups per molecule. By virtue of the use of a network a stable material is obtained the properties of which are only slightly governed by, for example, temperature. By employing a network, it suffices to use a proportionately small quantity of reactive material relative to the quantity of non-reactive material. The choice of the non-reactive material enables the properties of the material of the orientation layer to be adapted to the requirements within wide limits.

According to another aspect of the invention, the object of providing a liquid crystal display device comprising an orientation layer and switchable liquid-crystal material is achieved by a display device in which the orientation layer consists of an oriented polymer network in which a non-reactive liquid-crystal material is dispersed. An anisotropic gel consisting of a network of a uniaxially oriented polymer and a liquid-crystal material dispersed therein is described per se in the non-prepublished Netherlands Patent Application NL 9000808 which is filed by Applicants.

A very strong interaction between the orientation layer and the switchable liquid-crystal material and, consequently, a very effective orienting effect is obtained when the non-reactive liquid-crystal material in the orientation layer has the same composition as the switchable liquid-crystal material.

The invention can be used for the manufacture of a passive display device in which electric conductor tracks, for example of transparent indium oxide/tin oxide, may be situated on the substrate. The invention can very suitably be used for the manufacture of an active display device in which the orientation layer is provided on a substrate comprising electric switching elements. Such switching elements are constructed, in known manner, as semiconductor switches comprising, inter alia, transistors.

BRIEF DESCRIPTION OF THE DRAWINGS

The invention will be explained in greater detail by means of an exemplary embodiment and a drawing, in which FIG. 1 diagrammatically shows a liquid crystal display device according to the invention.

DESCRIPTION OF THE PREFERRED EMBODIMENTS

Exemplary embodiment

Figure 1:
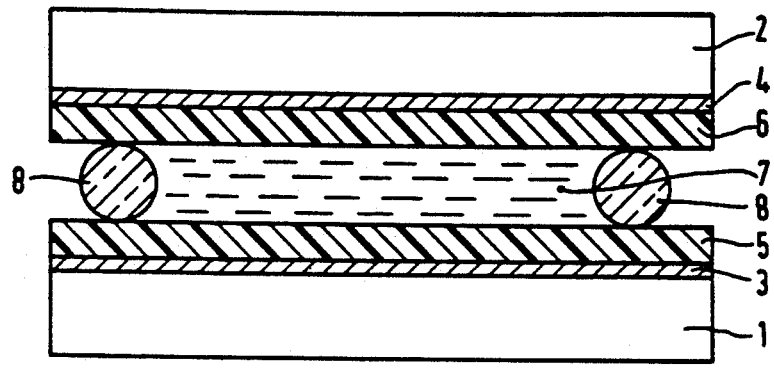

A liquid crystal display device was manufactured from two flat substrates 1,2 of glass which were provided with electric conductor tracks 3,4 of indium oxide/tin oxide according to a desired pattern, see FIG. 1. If desired, the substrates may be provided with switching elements such as transistors which are constructed as, for example, thin layers of amorphous silicon.

Figure 2:
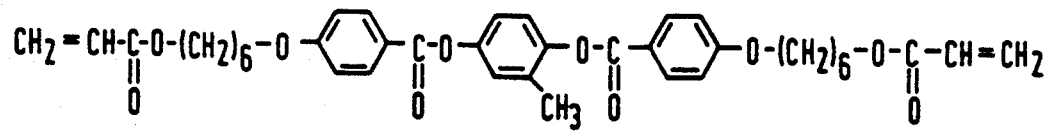
FIG. 2 shows the structural formula of a reactive liquid-crystal material.
Figure 3:
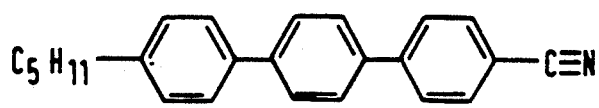
FIG. 3 shows the structural formulae of the components of a mixture of non-reactive liquid-crystal materials.
Figure 3:
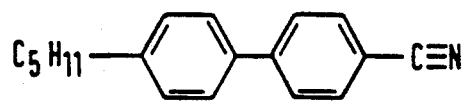
Figure 3:
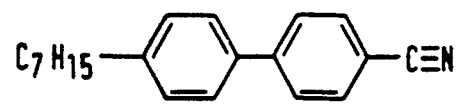
Figure 3:
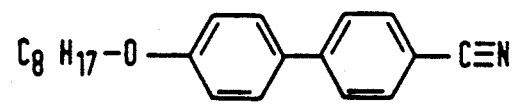

A mixture of liquid-crystal materials was manufactured from 10% by weight of a reactive liquid-crystal material, 88% by weight of a non-active liquid-crystal material and 2% by weight of the light-sensitive initiator 2,2-dimethoxy-2-phenyl-aceto phenone. The diacrylate compound C6M, the structural formula of which is shown in FIG. 2, was used as the reactive liquid-crystal material. The mixture E7 from BDH Chemicals Limited, the composition of which is % by weight is shown in FIG. 3, was used as the non-reactive liquid-crystal material.

The mixture was provided on the substrates 1, 2 in the form of thin layers having a thickness of 10 $\mu$m and brought into contact with the surface of rubbed polyethylene foils. As a result thereof, the molecules of the mixture were oriented in the direction in which the foils were rubbed. The diacrylate compound C6M was made to cure by exposing it to UV light, thereby forming the orientation layers 5, 6. The intensity of the UV light was 0.2 mW/cm$^2$ at the location of the layers 5, 6. By means of the above-mentioned curing operation a polymer network was formed in which the non-reactive material was dispersed. After curing the polyethylene foils were removed.

According to a method which is known per se, a cell was manufactured by locating the substrates 1 and 2, including the layers provided thereon, opposite each other and providing a switchable liquid-crystal material, according to the example the mixture E7, between said substrates. Glass fibers 8 having a diameter of 10 $\mu$m and serving as spacers were provided between the substrates. The cell was sealed in a customary manner by applying an epoxy resin adhesive, not shown in the Figure, along the edges of the cell.

It was found that the orientation layers 5 and 6 very effectively induce the desired orientation in the switchable liquid-crystal material 7. The desired angle of inclination can be obtained within wide limits by adapting the composition of the orientation layers, in particular by the choice of the non-reactive liquid-crystal material. In addition, the orientation layers have favourable optical properties such as transparency and flatness.

I claim:

1. A liquid crystal display device comprising a switchable liquid-crystal layer and an orientation layer, for orienting the liquid-crystal material of said switchable liquid-crystal layer, characterized in that the orientation layer consists of an oriented polymer network in which a liquid-crystal material is dispersed.

2. A liquid crystal display device as claimed in claim 1, characterized in that the liquid-crystal material in the orientation layer has the same composition as the liquid-crystal material in the switchable liquid crystal layer.

3. A liquid crystal display device as claimed in claim 1, characterized in that the orientation layer is provided on a substrate comprising electric switching elements.

4. A liquid crystal display as claimed in claim 2, characterized in that the orientation layer is provided on a substrate comprising electric switching elements.

* * * * *